(Model.)
S. H. WALZ.
CAR WHEEL.
No. 251,661. Patented Dec. 27, 1881.
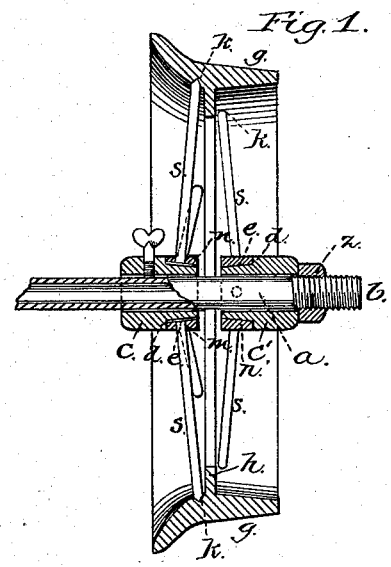
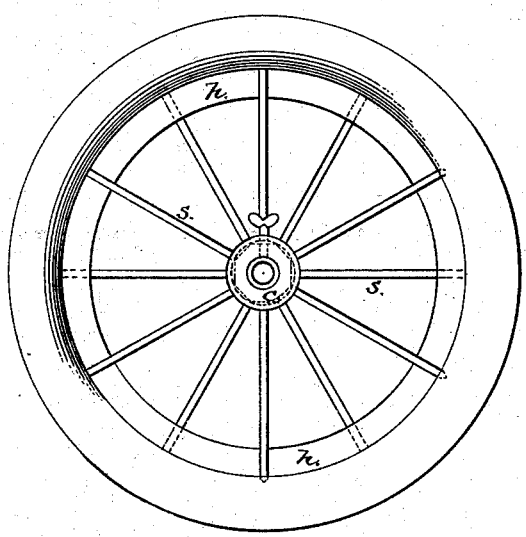
WITNESSES
Villette Anderson
Philip C. Masi
INVENTOR
Samuel H. Walz
by Anderson & Smith
his ATTORNEYS

UNITED STATES PATENT OFFICE.

SAMUEL H. WALZ, OF THREE RIVERS, MICHIGAN.

CAR-WHEEL.

SPECIFICATION forming part of Letters Patent No. 251,661, dated December 27, 1881.

Application filed November 19, 1881. (Model.)

*To all whom it may concern:*

Be it known that I, SAMUEL H. WALZ, a citizen of the United States, resident of Three Rivers, in the county of St. Joseph and State of Michigan, have invented a new and valuable Improvement in Railroad-Car Wheels; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical section of my invention, and Fig. 2 is a side view.

This invention has relation to wheels for cars of light character, especially light hand-cars; and it consists in the construction and novel arrangement of the steel tread, having an interior annular abutment-rib and recesses on each side of the same for the ends of the spokes, the shouldered hubs or bearings on the axle, the perforated or recessed bands, the spokes, tubular threaded axle, and bracing-nut, all as hereinafter set forth, and especially pointed out in the claim hereto appended.

In the annexed drawings, the letter $a$ designates the axle, which is preferably made in tubular form to avoid unnecessary weight. It is threaded at its outer end, as indicated at $b$.

$c\ c'$ represent the hubs or bearings, two of these being provided on the axle for each wheel. The inner hub, $c$, of the pair is designed to be secured to the axle in a fixed manner by means of a key, set-screw, or other common device for the purpose. The outer hub, $c'$, is designed to have a sliding movement on the axle. Each of these hubs is formed with an inner shoulder, $d$, and a beveled bearing, $e$, next said shoulder, as indicated in the drawings.

The tire portion or tread $g$ of the wheel is designed to be made of steel, and consists of an annular rim having the exterior contour of a light car-wheel tread, and provided on its inner surface with an annular rib or abutment, $h$. On each side of this rib are formed, in the inner surface of the tire portion, at regular distances apart, recesses or bearings $k$, these being arranged in succession, first on one side and next on the other side of the rib of the wheel, as indicated in the drawings.

$s$ represents the spokes, which are metallic rods having their outer ends formed to fit the bearings $k$ of the tread portion of the wheel. The inner ends of these spokes are fitted into recesses or perforations $m$ in bands $n$, which are somewhat conical or beveled to fit the beveled bearings $e$ of the hubs, and abut against the shoulders $d$ thereof. The inclination of the bearing $e$ and the seat-band $n$ is designed to be at right angles, or nearly so, to the spokes, which are of sufficient length to extend obliquely from their bearing-recesses $k$ in the tire portion inwardly and outwardly to their hub-bearings.

A nut, $z$, on the outer threaded end of the axle serves to force the outer hub-bearing toward its fellow, bringing the outer and inner sets of spokes toward each other, and bracing them in firm and secure engagement with the tire and hub bearings.

Having described this invention, what I claim, and desire to secure by Letters Patent, is—

The car-wheel described, consisting of the tread portion $g$, having the inner rib, $h$, and alternate bearings $k$ on each side thereof, the shouldered hubs $c\ c'$, their beveled bearings $e$, the conical bands $n$, having the recesses $m$, the outwardly and inwardly inclined spokes $s$, and the brace-nut $z$, substantially as specified.

In testimony that I claim the above I have hereunto subscribed my name in the presence of two witnesses.

SAMUEL H. WALZ.

Witnesses:
NEWTON H. BARNARD,
AMOS HOMES.